R. E. CARTZDAFNER.
DUMP CAR LOCK.
APPLICATION FILED DEC. 26, 1911.
1,034,418.
Patented Aug. 6, 1912.
2 SHEETS—SHEET 1.
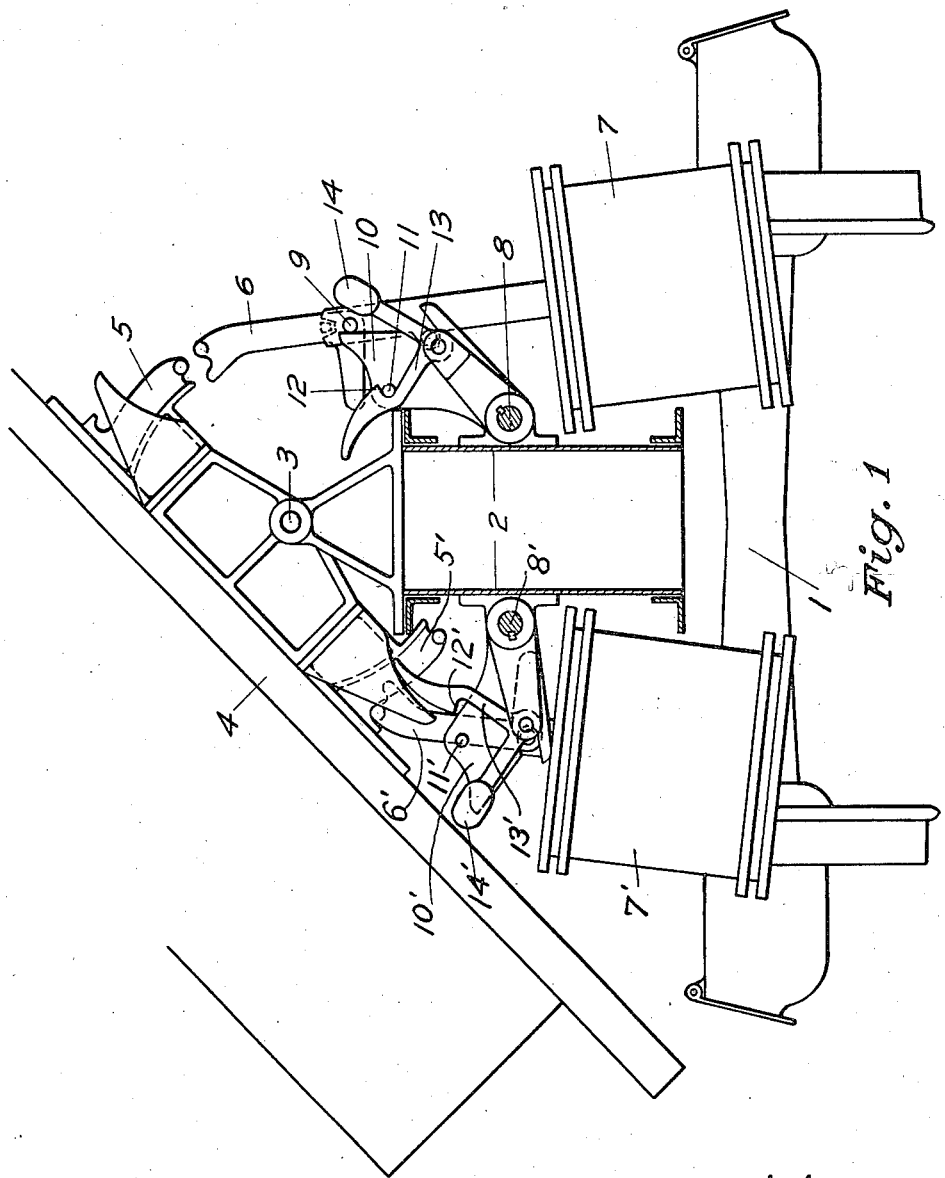

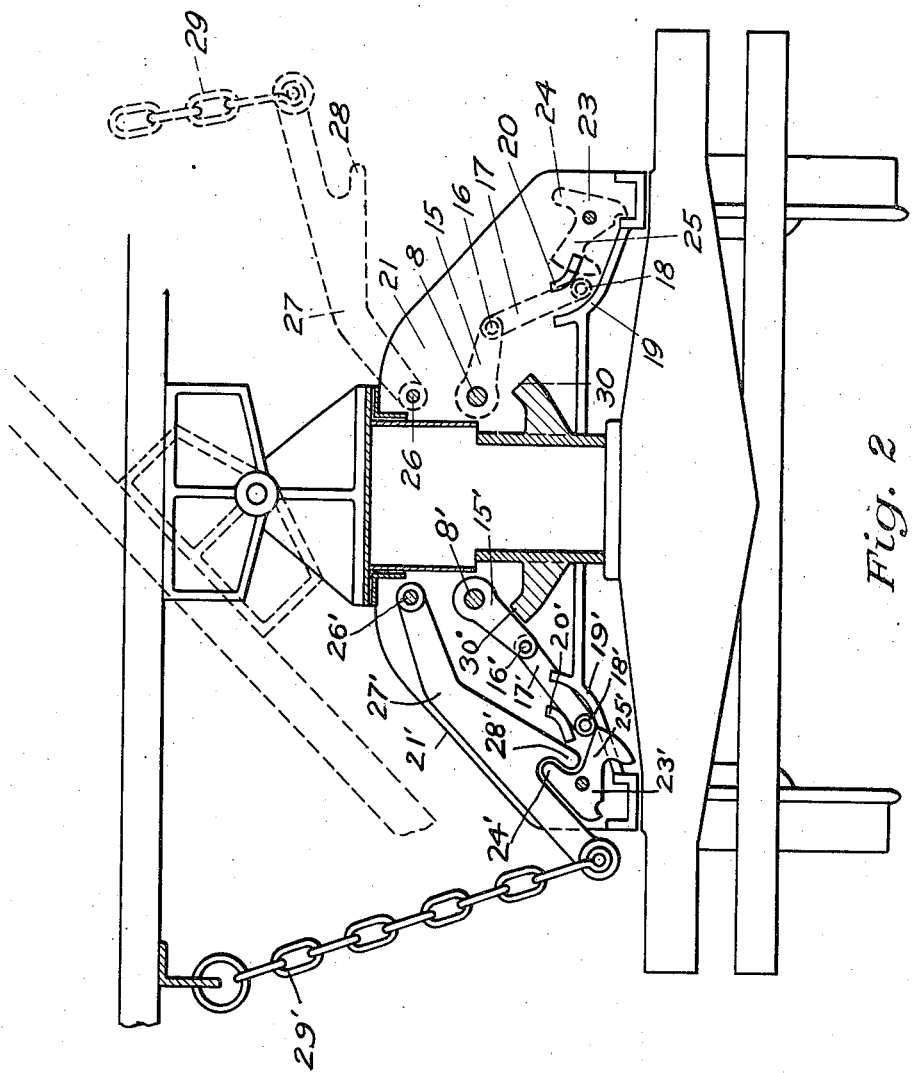

UNITED STATES PATENT OFFICE.

ROY E. CARTZDAFNER, OF COLUMBUS, OHIO, ASSIGNOR TO THE KILBOURNE & JACOBS MANUFACTURING COMPANY, OF COLUMBUS, OHIO, A CORPORATION OF OHIO.

DUMP-CAR LOCK.

1,034,418.  Specification of Letters Patent.  Patented Aug. 6, 1912.

Application filed December 26, 1911. Serial No. 667,976.

*To all whom it may concern:*

Be it known that I, ROY E. CARTZDAFNER, a citizen of the United States, residing at Columbus, in the county of Franklin and State of Ohio, have invented certain new and useful Improvements in Dump - Car Locks, of which the following is a specification.

This invention relates to improvements in dump cars, especially of a kind which are arranged upon a central longitudinal pivot and are therefore adapted to be dumped laterally in either direction.

Means are provided for dumping the car at the will of the operator, and the chief feature of the invention is the provision of means for locking the car bed in its normal carrying position, which means are adapted to be unlocked by the dumping devices at the proper time for the dumping of the car bed.

Essentially, the invention involves a pivoted lock member, adapted to engage with a pivoted latch to lock the car bed, and a movable member is provided for positioning a latch member against unintended movement.

The dumping devices control a shaft to which is connected the movable positioning member mentioned, and therefore the movement of the dumping devices so manipulates the positioning member that the latch and pivoted member are readily pulled apart by the upward movement of the car bed when being dumped. On the opposite side of the car an identical device is provided which is not disturbed by the dumping of the car bed nor by its righting, which remains in proper position for preventing the car bed when being righted from swinging beyond the normal horizontal position.

The specific features of the locking device will be hereinafter set forth.

In the drawings which are hereto attached, and which are hereby made a part of this specification, Figure 1 shows a vertical transverse section through the car, illustrating the dumping device; Fig. 2 shows a vertical transverse section through the car at the bolster, illustrating the locking device.

In the drawings, 1 is a car truck supporting a frame 2, upon which is pivotally mounted at 3 the car bed 4, adapted to be swung laterally for dumping or for righting. Attached appropriately to the car bed are members 5—5' with which are adapted to contact the piston rods 6—6' for dumping or righting the car bed. The piston rods 6—6' extend upwardly from the cylinders 7—7', which are mounted on the underframe of the car, and air, or other motive means, is admitted to the cylinder in any desired manner for the purpose of controlling the movement of the pistons. The air is adapted to be controlled from the engine operating the train by well understood means which need not be here illustrated, as that particular feature forms no part of this invention.

The shafts 8—8' are mounted on the frame 2 and extend longitudinally thereof and are rotated by the upward movement of the piston rods 6—6' as follows: The pins 9—9' (the latter not visible) of the piston rods are adapted to engage the members 10—10', loosely mounted on shafts 8—8'; and as the members 10—10' are thus rotated on the shafts, pins 11—11' thereon engage the hooks 12—12' on the members 13—13', which are rigidly secured to the said shafts, and as the piston rods rise the said shafts are rotated. The members 13—13' are counterweighted at 14—14', so that when the piston rods are lowered the said members fall into normal position. The construction of the two sides of the car is thus seen to be identical, and so arranged that when the construction on one side is used for dumping the car, the construction on the opposite side is used for restoring the car bed to its normal position, the car being adapted for dumping toward either side, at the will of the operator. It is also apparent that the movement of parts to restore the car to normal position is not such as to affect the locking hereinafter described, so that the locking devices will prevent the car bed when being righted from rotating past the normal position.

Referring to Fig. 2, shafts 8—8' are seen to have rigidly mounted thereon rock arms 15—15', to which are pivotally connected at 16—16' arms 17—17', provided at their free ends with rollers 18—18'. When the said shafts are rotated as above described, the arms 17—17' are moved and the rollers thereon are caused to travel between the guides 19—19' and 20—20' respectively, mounted on the bolster diaphragms 21—21' of the car. Pivoted dogs 23—23' are provided, having thereon the locking portions 24—24' and the extended portions 25—25', with which the said rollers engage when the parts are in normal position, as illustrated on the left in Fig. 2, and when the rollers are withdrawn by the rotation of the said shaft the said dogs assume the position shown at the right in Fig. 2 for dog 23. At 26—26' are pivotally mounted arms 27—27' formed with the hooks 28—28' on the under side to engage the locking portions 24—24' of the said dogs and thereby lock the two parts together when in the position illustrated at the left in Fig. 2. The arms 27—27', at their outer ends have attached thereto the chains 29—29' which are connected with the under side of the car bed, and when the latter is in its normal position the members of the locking device are secured together as described above and shown at the left in Fig. 2, and the chain is taut.

It will be noted that the arm and the dog constituting the locking features are mounted on the bolster diaphragm of the car, and are therefore less subject to vibration and consequent danger of being unlocked by jarring than would be the case if they were mounted on the truck, as is the common practice observed with locking devices of various kinds hitherto put into use. The resulting condition of stability and security thereby provided is regarded as a distinct improvement in the car art, and is intended to be emphasized herein.

Referring to Fig. 2, the members are shown unlocked at the right and locked at the left. When the shaft 8 is in its normal position the rock arm 15 thereon rests against the lug 30, which prevents said shaft from rotating too far. At the right, in Fig. 2, said shaft is shown in its rotated position, whereby arm 17 has been elevated so that the roller 18 thereon is out of engagement with the extended portion 25 of the dog 23, and said dog is shown in its unlocked position, thereby permitting the pivoted arm 27 to be elevated by the chain 29, attached to the car bed, as the latter is dumped by the device illustrated generally in Fig. 1 and hereinbefore described. At the left, in Fig. 2 is illustrated the position of the corresponding members when the car bed is in its normal horizontal position, and it is seen that the locking device on said left side is undisturbed when the car bed is dumped toward that side, the only change effected therein being the stacking of the chain 29. When the car bed is to be righted, it is seen, by referring to Fig. 1, that the piston 6' engages the member 5', at a point near the under side of the car bed, and said piston 6' is moved upwardly to rotate the car bed back to its normal position without the moving of the various members noted at the left in Fig. 1 sufficiently to rotate the shaft 8'; and accordingly the locking devices shown at the left end, in Fig. 2, are undisturbed by this rotating movement. It will be understood that if the car bed is to be dumped toward the right, then a movement among the various members shown at the left in the two figures of the drawings takes place in the same manner as has been hereinbefore described for the members shown on the right of the two figures when the car bed is to be dumped toward the left.

Referring to the right hand side of Fig. 1, the piston rod 6 has tilted the car bed to such a degree that the momentum thereby imparted carried the car bed over completely to its unloading position, and to economize, the air operating the piston is shut off as soon as the proper elevation is reached by the piston rod. Thereupon, the piston slowly settles back to its lowered position and the shaft 8 rotates back to normal position therewith, until the roller 18 contacts with the end of the extended portion 25 of the dog 23, as shown at the right in Fig. 2. This position of the roller and dog is maintained until the car bed is righted, whereby the arm 27 is lowered again to such a point that the projection 28 strikes the upper face of the extended portion 25 and drives the said portion to a lowered position, and the consequent rotation of the dog 23 brings the projection 24 thereon into a locking engagement behind the projection 28, as is clearly shown in the position of members 23' and 28' at the left in Fig. 2. When the dog 23 is rotated to this position, as stated, the roller 18 is free to move outwardly between the guides 19 and 20 to contact with the upper side of the said extended portion 25, as is seen by reference to the left in Fig. 2 for roller 18'. This outward movement of the roller 18 is caused by the rotation of the shaft 8 under the influence of the weight of the members shown at 13 and 14 and the rock arm 15 and the arm 17, so that the return of all the parts to locking position is accomplished automatically.

By this construction, a positive device for locking the car is provided, which is automatic, and is mounted on the bolster of the car where it is less subject to the jarring influences incident to the movement and operation of the car. It is also seen that the locking device is operated by the piston rod in its upward movement to cause the car bed to tilt from its normal position, and it is not disturbed by the upward movement of the piston rod to right or restore the car bed to its normal position, and the whole device is so inclosed between the bolster diaphragms that injury thereto by accident in handling the car bed or lading is unlikely to occur.

The invention is set forth in the appended claims, and modifications which are within the spirit of the invention are intended to be covered thereby.

What I claim is:—

1. In a dump car, an automatic locking device comprising a pivoted member mounted on the underframe of said car and connected with the car body, a second pivoted engaging member positioned on the underframe, and a member adapted to hold said members in locking engagement.

2. In a dump car, a locking device comprising a member pivotally mounted on the underframe of the car and connected with the car body, a second member pivotally mounted on the underframe adapted to have locking engagement with said first member, and a third member adapted to engage said second member to maintain said locking engagement.

3. In a dump car, a shaft, means for rotating said shaft when the car body is dumped, pivoted members mounted on the underframe of said car adapted for locking engagement with each other, and a member connected with said shaft adapted to maintain said locking engagement until said shaft is rotated.

4. In a dump car, a member pivotally mounted on the car underframe and connected with the body of said car, a second member pivotally mounted on the car underframe and adapted for locking engagement with said first member, a third member positioned to maintain said locking engagement and adapted to be moved automatically to permit unlocking when the car is to be dumped.

5. In a dump car, a pivoted locking member adapted to be rotated by the tilting of the car body, a second locking member adapted for engagement with said first member pivotally mounted on the underframe of said car, a third member adapted to engage said second member to maintain said first two members in locking engagement, and means for dumping said car adapted to move said third member to permit unlocking of said first two members.

6. In a dump car having a pivotally mounted car body, a lock therefor comprising a pivoted member connected to said car body for operation thereby, a second pivoted member mounted on the underframe of said car, means for dumping said car, and a member adapted to maintain the locking engagement between said first two members and adapted to be withdrawn by said dumping means.

7. In a dump car having a pivoted car body and an underframe, a locking device for said car body comprising a locking member pivoted on said underframe and connected with said car body, a second locking member pivoted on said underframe to engage said first member, a third member positioned to engage said second member to maintain said locking engagement, dumping means for said car body adapted to withdraw said third member to permit the unlocking of said first two members, whereupon said car body is free to be tilted.

In testimony whereof I affix my signature in the presence of two witnesses.

ROY E. CARTZDAFNER.

Witnesses:
LYDIA JONES,
JAMES D. BENBOW.